Patented Jan. 8, 1952

2,581,903

UNITED STATES PATENT OFFICE 2,581,903

METHYLATION OF CURARE

Malcolm D. Bray, Noblesville, Ind., assignor to Eli Lilly and Company, Indianapolis, Ind., a corporation of Indiana No Drawing. Application November 3, 1949, Serial No. 125,398

5 Claims. (Cl. 260—236)

This invention relates to the preparation of lissive-active derivatives of curare alkaloids and more particularly to the methylation of d-tubocurarine in tubocurare.

The preparation of d-tubocurarine dimethyl ether chloride and iodide from pure, crystalline d-tubocurarine chloride has been described by King [J. Chem. Soc. 138, 1381 (1935)] and Dutcher [J. Am. Chem. Soc. 68, 419 (1946)]. However, the pure d-tubocurarine chloride used as the starting material in the above-mentioned syntheses is very difficult to obtain, for its preparation requires complicated, costly and inefficient procedures. Therefore, those methods of obtaining the methyl ether of curare which require pure d-tubocurarine chloride as the starting material are not suitable for the preparation of the dimethyl ether of tubocurarine in the quantities required for widespread therapeutic application.

An object of my invention is to provide a simple process of obtaining pure, crystalline, methylated d-tubocurarine hydroxide and salts. Other objects will be apparent from the following description of my invention.

In accordance with the above and other objects, dimethylated d-tubocurarine hydroxide and dimethylated d-tubocurarine salts are obtained directly and in good yield from tubocurare by treating the tubocurare with an alcoholic alkali solution, removing the alkali-insoluble fraction, and reacting the alkaline alcohol solution containing the curare alkaloid with a methyl ester of an inorganic acid, e. g., methyl sulfate, methyl iodide and the like. The corresponding salt of the dimethyl ether of the d-tubocurarine which is formed by the reaction can be isolated in the form of the particular salt which is produced in the reaction mixture or, if desired, can be converted into dimethyl d-tubocurarine hydroxide or into a different salt, and isolated in such form.

Illustratively, the practice of my invention is carried out in accordance with the general procedure described below.

Crude tubocurare is mixed with a lower monohydric alcoholic solution of a strong alkali, and the mixture is heated for a short period of time to dissolve substantially all of the lissive-active alkaloid present. The insoluble, inactive portion is then separated, and to the solution which contains the active alkaloidal material is added an equivalent or more of the methylating agent. The solution is then heated until substantially complete methylation of the tubocurare has taken place. The methylated product is isolated by evaporating the reaction mixture to a small volume and cooling the concentrated solution, whereupon crystals of the salt of the dimethyl ether of d-tubocurarine are formed. The dimethyl ether salt crystals are filtered off, washed with a small volume of cold alcohol, and purified by recrystallization from a suitable solvent.

The dimethyl ether of d-tubocurarine hydroxide can be obtained by adding to the reaction mixture an excess of a concentrated solution of strong alkali, thereby forming d-tubocurarine dimethyl ether hydroxide, and evaporating the reaction mixture until the hydroxide precipitates. The hydroxide which is isolated can be converted to salts of tubocurarine dimethyl ether by treatment with acids. For example, treatment of the hydroxide with phosphoric acid yields d-tubocurarine dimethyl ether phosphate.

The curare materials which serve as starting materials in the process of my invention are the crude, tarry tubocurare of commerce, and the partially purified dried tubocurare preparations which are commercially available, the latter generally being dark brown powders containing from 20 to 40 per cent of d-tubocurare. Also, there can be employed the relatively less crude preparation of tubocurare such as that obtained by the method described in United States Patent No. 2,453,873 issued November 16, 1948 to F. A. Steldt.

The alcohol used in preparing the alkali solution for the purpose of my invention can be any of the lower monohydric aliphatic alcohols in which strong alkalies are soluble. The alkali used is a strong alkali which is soluble in the selected alcohol, for example, sodium hydroxide or potassium hydroxide. The latter is especially suitable because of its ready alcohol solubility. The alkali is used in a concentration from about 0.1 N to about 2 N. For convenience of preparation and use, I prefer to use 0.5 N alkali, but alcoholic solutions of greater or lesser concentration can be employed if desired, or as are permitted or limited by the solubility characteristics of the alkali selected.

The methylating agent used is a methyl ester of an inorganic acid, for example, methyl or dimethyl sulfate or methyl chloride, methyl bromide or methyl iodide. Methyl iodide is the methylating agent of choice because of its reactivity and because of its higher boiling point which makes unnecessary the employment of superatmospheric pressures. Furthermore, the relative insolubility of the d-tubocurarine dimethyl ether iodide which is formed in the methylation reaction contributes to the ease of isolation of the methylated product.

The invention is further illustrated by the following specific examples.

Example 1

Preparation of crystalline d-tubocurarine dimethyl ether iodide from crude tubocurare.

50 g. of crude, tarry curare as received in commerce and containing about 20 percent of d-tubocurarine are suspended in 400 cc. of 0.5 N methanolic potassium hydroxide, and the mixture is boiled for ten minutes. The dark brown insoluble material is filtered off and the filtrate is treated with 50 cc. of methyl iodide and refluxed gently for about 8 hours. An additional amount of 25 cc. of methyl iodide is added to the reaction mixture and the refluxing is continued for 8 hours. The reaction mixture is evaporated to small volume, whereupon the d-tubocurarine dimethyl ether iodide precipitates. The precipitate is filtered off and dissolved in boiling water. The hot solution is treated with a small amount of decolorizing carbon, the carbon filtered off and the filtrate cooled to about 0° C. The dimethyl ether of d-tubocurarine iodide crystallizes in white crystals which melt at about 267–270° C. with decomposition.

Using the quantities indicated above, 9.75 g. of the dimethyl ether of d-tubocurarine iodide were obtained from the crude curare. This represented a yield of about 85 percent of the amount theoretically obtainable from the d-tubocurarine experimentally determined to be present in the curare. Analysis of the dimethyl ether thus prepared showed the presence of 2.90 percent nitrogen as compared with the calculated amount of 3.0 percent.

Example 2

Preparation of crystalline d-tubocurarine dimethyl ether iodide.

5 g. of dried tubocurare containing about 20 percent of d-tubocurarine are suspended in 50 cc. of a 0.5 N solution of sodium hydroxide in 95 percent ethyl alcohol, and the mixture is gently refluxed for about 10 minutes. The insoluble material is filtered off, the filtrate is treated with 5 cc. of methyl iodide and the mixture refluxed for about 8 hours. An additional amount of 3 cc. of methyl iodide is added to the reaction mixture and refluxing is continued for 8 hours. The reaction mixture is then evaporated to a small volume whereupon the dimetehyl ether of d-tubocurarine iodide precipitates. The precipitate is filtered off, and purified according to the procedure described in Example 1.

Example 3

Preparation of d-tubocurarine dimethyl ether phosphate.

5 g. of crude tubocurare of commercial type are treated with 45 cc. of 0.5 N methanolic potassium hydroxide according to the procedure of Example 1. To the alkaline filtrate containing the curare alkaloid are added slowly and in small portions, 4 cc. of dimethylsulfate, and the mixture is allowed to stand at room temperature for about 2 hours. The reaction mixture is cooled to about 0° C. and while cold is treated with an excess of concentrated sodium hydroxide solution. The mixture is evaporated to about half its volume and the precipitate of d-tubocurarine dimethyl ether hydroxide which forms is filtered off. The precipitate is suspended in several cc. of water and is treated with a slight excess of phosphoric acid and the mixture is then cooled to about 0° C., the crystalline d-tubocurarine dimethyl ether phosphate is filtered off, and recrystallized from a small amount of boiling water.

Example 4

Preparation of d-tubocurarine dimethyl ether cloride from partially purified curare.

The procedure of Example 2 is followed except that methyl chloride is used in place of methyl iodide, and the reaction mixture is heated in a pressure tube at about 60° C. for about 14 hours. The d-tubocurarine dimethyl ether chloride is purified by dissolving it in a minimum amount of hot water, and cooling the solution to obtain crystals of the salt.

I claim:

1. The method of methylating tubocurare which comprises treating tubocurare with a lower monohydric alcohol solution of a strong alkali, removing the alcoholic alkali-insoluble portion, and heating the alcoholic alkali solution with a methyl ester of an inorganic acid.

2. The method of obtaining methylated curare which comprises reacting the alcoholic alkali-soluble portion of tubucurare with a methyl ester of an inorganic acid.

3. The process of obtaining a d-turbocurarine dimethyl ether salt which comprises treating tubocurare with a lower monohydric alcohol solution of a strong alkali, removing the alcoholic alkali-insoluble portion, heating the alcoholic alkali-soluble portion with a methyl ester of an inorganic acid, and evaporating the reaction mixture to a reduced volume to cause precipitation of the d-tubocurarine dimethyl ether salt.

4. The method of obtaining d-tubocurarine dimethyl ether iodide which comprises treating d-tubocurarine with alcoholic alkali, separating the alcoholic alkali-insoluble portion, heating the alcoholic alkali-soluble portion with methyl iodide, and recovering the d-tubocurarine dimethyl ether iodide.

5. In the method of preparing d-tubocurarine methyl ether iodide according to claim 1, the step of reacting the alcoholic alkali-soluble portion of tubocurare with methyl iodide.

MALCOLM D. BRAY.

REFERENCES CITED

The following references are of record in the file of this patent:

Dutcher: J. Amer. Chem. Soc., vol. 68, pp. 419–424 (1946).